Jan. 17, 1956  G. P. JONES  2,730,772
TRAILER WALL CONSTRUCTION
Filed June 22, 1953
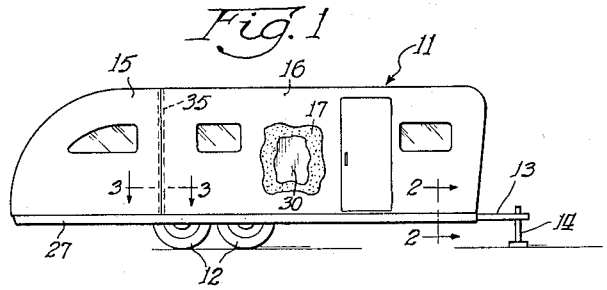
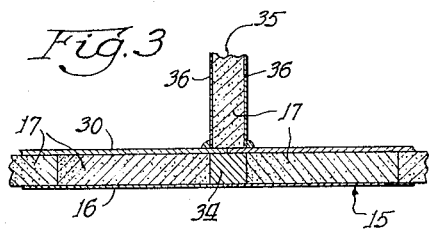
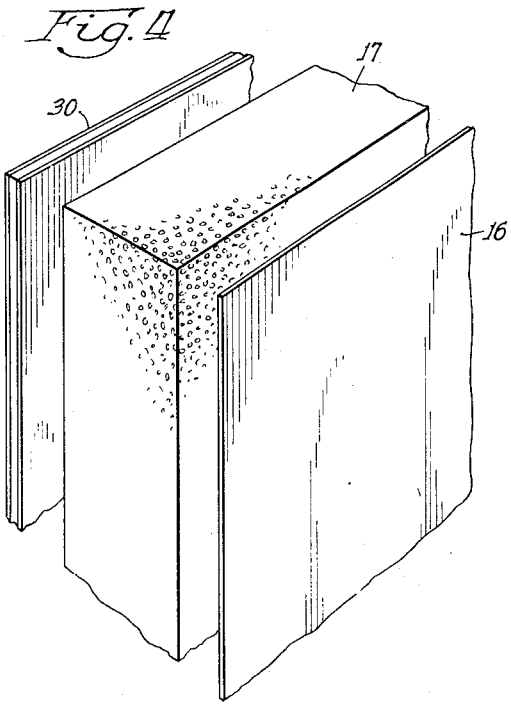
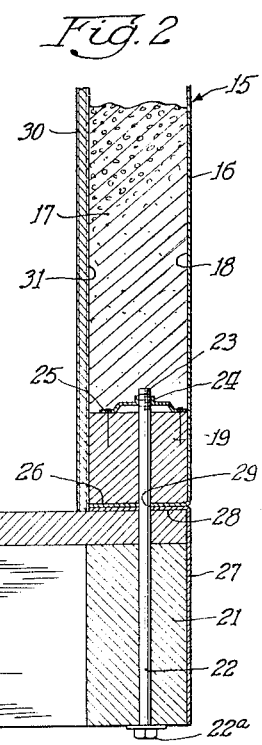
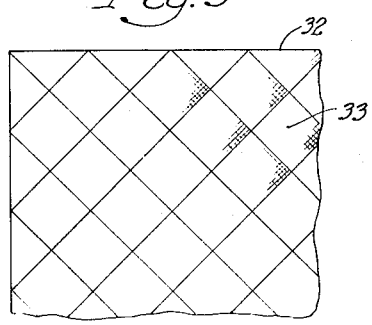
Inventor:
Gustaf P. Jones
By Jones, Tesch + Darbo
Attys.

United States Patent Office 2,730,772
Patented Jan. 17, 1956

2,730,772

TRAILER WALL CONSTRUCTION

Gustaf P. Jones, Pomona, Calif.

Application June 22, 1953, Serial No. 363,237

1 Claim. (Cl. 20—4)

This invention relates to a trailer wall construction.

The increasing use of trailers by motorists has accentuated the demand for a light but strong wall construction for such vehicles, and various materials have been tried for this purpose, some lighter than others but all contributing substantially to the weight of the wall, the difference in weight between them being a matter largely of degree.

Discarding previously used conventional trailer wall materials, the present invention discloses for the first time a trailer wall construction embodying a material so light and yet having self-supporting reinforcing and other desirable properties that its difference from previous such materials for this purpose is not merely one of degree but is a difference in kind.

I have found that a satisfactory wall construction for the purpose may consist of an outer sheathing of relatively thin but strong material providing an outer weather face and a wall member on the inner surface thereof of an air-expanded cellular plastic material in the form of a self-supporting panel having a thickness of the order many times the thickness of the sheathing and providing a structural core for the wall.

In practice the invention desirably contemplates the bonding of the sheathing and plastic panel together for added strength, and the covering of the inner, protected side of the plastic with an ornamental material, to adorn the living quarters provided by the trailer.

The invention will be understood by reference to the following description, taken together with the accompanying drawings of an illustrative embodiment thereof, and in which drawings—

Figure 1 is a general view of a trailer of the type referred to having the present invention incorporated therein;

Figure 2 is an enlarged sectional view of a lower corner wall construction embodying the present invention, and being a vertical section taken on the line 2—2 of Fig. 1;

Figure 3 is a horizontal section taken on the line 3—3 of Fig. 1;

Figure 4 is a still further enlarged perspective separated or so-called exploded view of wall parts shown in the previous figure; and Figure 5 shows an alternative form of inner wall covering.

Referring in detail to the illustrative construction shown in the drawings, the trailer indicated generally by the numeral 11 is here shown, for exemplification, as of the so-called house-trailer type having its own wheels 12 and having a forward coupling 13 by which it may be suitably connected, in a manner not here necessary to be described, with the rear end of a conventional automobile, for transportation purposes. When the trailer is disconnected from the automobile, as for locating in a given place for a substantial period of time, the support 14 may be employed to sustain the forward end of the trailer and maintain it in suitable horizontal position for purposes as living quarters for one or more people.

In accordance with the present invention, which is directed to a novel wall construction for trailers such as here illustrated, each side wall 15 of the trailer, only one of which is here shown, is formed of a composite structure including the outer sheathing 16, preferably of relatively thin sheet aluminum, and providing an outer weather surface for the wall, and an inner wall member 17, on the inner surface of the sheathing 16, of an air expanded cellular plastic material in the form of a self-supporting panel of the order of many times the thickness of the sheathing 16. Such a material 17 for my purpose I find in what is known as "Styrofoam" manufactured by Dow Chemical Company, Midland, Michigan. As to the relative thickness of the wall 16 and wall member 17, the aluminum sheathing 16 may be, say 1/32 inch thick while the plastic material 17 is, say, 2 inches thick.

In place of the metal sheathing 16, a somewhat stiff airplane cloth could be applied to the outer surface of the material 17 and finished with aircraft paint.

The material 17 is generally snow-white in color and is what is characterized as a cellular or multi-cellular "foam" produced by expanding polystyrene approximately forty times. At a density of say 1.6 lbs. per cubic foot, this plastic material has a compressive yield strength of between 20 and 30 lbs. per square inch, a tensile strength of between 35 and 65 lbs. per square inch, a compressive modulus of between 650 and 1250 lbs. per square inch, and a bending modulus of between 950 and 1250 lbs. per square inch. Panels or so-called boards of this material are available in nine foot lengths and of proportionate width.

While the plastic material 17 here described has also good insulating properties, both as to heat transfer and sound absorption, which properties are advantageous in trailer construction, the principal advantage of the use of this material in accordance with the present invention is the fact that it is a self-supporting wall material contributing relatively negligibly to the weight of the trailer wall while substantially strengthening and reinforcing the wall and permitting the use of light sheathing as an outside weathering surface, and thus providing a wall of enhanced structural strength with unexpected lightness of weight.

Desirably, and for added structural strength, the material 17 is bonded as at 18 to the sheathing 16 as for example by an asphalt type cement, one brand of which is available on the market under the name "Enamelite," manufactured by Presstite Engineering Company, St. Louis, Missouri. Linoleum and tile cements are suitable.

The material 17 while contributing important structural strength with negligible addition of weight and while having good heat and sound insulating properties is also beneficially of relatively low cost, moisture resistant, odorless, durable, vermin resistant, non-friable and of low thermal conductivity, thus making it a satisfactory material for low temperatures. While not fire proof to an open flame, the material is difficult to start burning and free access to air is needed for continued combustion.

Reverting again to the illustrative construction of Figs. 2 and 3, a plurality of panels or so-called boards of the material 17 may be disposed abreast and edge to edge on the inner surface of the sheathing 16 and bonded thereto as at 18 to make up the continuous wall 15, or such increments thereof as may be desired for convenient construction purposes. Thereupon the wall so formed may be bolted to a wall base runner 19 forming a part of the composite wall and which may rest on flooring 20 that in turn is supported by header joist 21, a bolt 22 passing upwardly through the joist, flooring, and wall base member and being threadedly engaged as at 23 with a burred hole 24 in a metallic anchor strip 25 embedded in the lower edge of the material 17 and retained therein by the base member 19 and inturned flange 26 of the sheathing 16. The exposed edges of flooring 20 and joist 21 may be preferably covered by another section of sheathing 27 which may have an inturned flange 28 underlapping the flange 26 of the sheathing 16. The flanges 26 and 28 may be perforated as at 29 for the passage of bolt 22. The bolt 22 may have a flanged head 22a.

To provide an inner covering for the material 17, on the living quarters side or interior of the trailer, a conventional ply-board 30 may be employed secured by any suitable means to the inner face of the plastic material 17. Preferably this also is bonded to the material 17 as at 31 to enhance the security of the covering material and also to contribute further to the structural strength of the composite wall construction of the present invention. The ply-board 30 may be suitably decorated as desired.

As an alternative to the ply-board 30, a plastic decorative material 32 may be employed which as shown in Fig. 4 may have a simulated quilt-like appearance as at 33. A suitable material for this purpose is that known as "Sealtuft" which is a so-called stitchless quilted plastic having the appearance of a cushion and being highly ornamental and wear resistant. It is as soft and pliable as a fabric and can be glued or otherwise secured to the inner surface of the plastic material 17. The material "Sealtuft" is a so-called "sandwich" or two layers of vinyl plastic filled with fire-retardant cellulose electronically welded, and can be obtained in various colors and design patterns.

As seen in Fig. 3, a studding 34 may be employed between sections of the wall. Furthermore, inner partitions for the trailer may be provided as at 35 formed of the material 17, with either ply-board or plastic decorative material on each face thereof as at 36.

So constructed and arranged the present invention provides a new and improved wall structure for trailers, of unique lightness and enhanced serviceability.

What is here claimed is:

In a composite wall structure for a habitable trailer vehicle, a horizontal base runner member, a plurality of panels of pre-formed air-expanded cellular polystyrene arranged in a common plane on said runner member with vertical edges of the panels abutting, inner and outer sheathings of relatively thin material intimately attached to said panels and extending continuously over said plurality thereof, at least said outer sheathing lapping said runner member, and means carried in part by said runner member for securing the composite wall structure to a flooring or the like.

References Cited in the file of this patent
UNITED STATES PATENTS

| | | |
|---|---|---|
| 1,712,965 | Maranville | May 14, 1929 |
| 2,381,631 | Waring | Aug. 7, 1945 |
| 2,484,608 | Cheyney et al. | Oct. 11, 1949 |
| 2,521,470 | Matheson | Sept. 5, 1950 |
| 2,552,641 | Morrison | May 15, 1951 |
| 2,621,139 | Messing | Dec. 9, 1952 |